US011050335B2

(12) United States Patent
Kim et al.

(10) Patent No.: US 11,050,335 B2
(45) Date of Patent: Jun. 29, 2021

(54) TRANSVERSE FLUX TYPE LINEAR MOTOR AND LINEAR COMPRESSOR HAVING THE SAME

(71) Applicant: LG Electronics Inc., Seoul (KR)

(72) Inventors: Jaebeum Kim, Seoul (KR); Susok Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 221 days.

(21) Appl. No.: 16/269,157

(22) Filed: Feb. 6, 2019

(65) Prior Publication Data

US 2019/0245425 A1     Aug. 8, 2019

(30) Foreign Application Priority Data

Feb. 7, 2018 (KR) .................. 10-2018-0015253

(51) Int. Cl.
*H02K 41/03* (2006.01)
*H02K 7/06* (2006.01)
*F04B 35/04* (2006.01)
*H02K 1/17* (2006.01)
*H02K 3/28* (2006.01)
*H02K 7/14* (2006.01)

(52) U.S. Cl.
CPC .......... *H02K 41/031* (2013.01); *F04B 35/04* (2013.01); *H02K 1/17* (2013.01); *H02K 3/28* (2013.01); *H02K 7/06* (2013.01); *H02K 7/14* (2013.01)

(58) Field of Classification Search
CPC .......... H02K 41/031; H02K 1/17; H02K 1/34; H02K 41/00; H02K 41/02; H02K 41/03; H02K 41/033; F04B 35/04; F04B 35/045

USPC ................ 310/12.24, 12.25, 12.26, 216.008, 310/216.088
See application file for complete search history.

(56) References Cited

U.S. PATENT DOCUMENTS

2005/0057101 A1* 3/2005 Nakagawa ........... H02K 41/033
                                                            310/12.24
2017/0373576 A1* 12/2017 Jeong ..................... F04B 35/04

FOREIGN PATENT DOCUMENTS

| JP | 11187638 | 7/1999 |
| JP | 2000083364 | 3/2000 |
| JP | 2007318858 | 12/2007 |
| JP | 2007318858 A | * 12/2007 |
| KR | 1020040088472 | 10/2004 |

(Continued)

OTHER PUBLICATIONS

Ariga (JP 2007318858 A) English Translation (Year: 2007).*

*Primary Examiner* — Tulsidas C Patel
*Assistant Examiner* — Robert E Mates
(74) *Attorney, Agent, or Firm* — Fish & Richardson P.C.

(57) ABSTRACT

A transverse flux type linear motor and a linear compressor having the same include: a stator core in which a plurality of stator sheets are laminated along an axial direction; a winding coil provided in the stator core to form an alternating magnetic flux in a transverse direction perpendicular to the axial direction in the stator core; a plurality of magnets fixedly coupled to a radial side surface of the stator core to have different magnetic poles alternately arranged along the axial and circumferential directions; and an integral mover provided with a radial air gap with respect to the plurality of magnets to reciprocate in an axial direction with respect to the stator core by a magnetic force formed on the magnet.

17 Claims, 9 Drawing Sheets

(56) References Cited

FOREIGN PATENT DOCUMENTS

| KR | 100492615 | B1 | 6/2005 |
| KR | 100539813 | B1 | 1/2006 |

* cited by examiner

TRANSVERSE FLUX TYPE LINEAR MOTOR AND LINEAR COMPRESSOR HAVING THE SAME

CROSS-REFERENCE TO RELATED APPLICATIONS

The present disclosure relates to subject matter contained in priority Korean Application No. 10-2018-0015253, filed on Feb. 7, 2018, which is herein expressly incorporated by reference in its entirety.

TECHNICAL FIELD

The present disclosure relates to a transverse flux type linear motor in which a direction of the flux is perpendicular to a motion direction of a mover, and a linear compressor having the same.

BACKGROUND

A motor is a device that converts electrical energy into mechanical energy to obtain rotational force or reciprocating power, and such a motor may be divided into an AC motor and a DC motor depending on the type of power applied thereto.

The motor includes a stator and a mover or rotor, and a permanent magnet, and the mover provided with a magnet, which is a permanent magnet, rotates or reciprocates according to the direction of a magnetic flux generated when current flows through a coil provided in the stator.

The motor may be divided into a rotary motor or a linear motor according to the motion mode of the mover. A magnetic flux is formed in the stator by power applied to the coil, and the mover rotates with respect to the stator by the magnetic flux in the rotary motor, whereas the linear motor reciprocates linearly with respect to the stator in the linear motor.

The linear motor may be divided into a flat plate type and a cylindrical type according to the shape, and in a mainly known cylindrical linear motor, a stator consisting of an inner stator and an outer stator is formed in a cylindrical shape, and a mover that reciprocates in an air gap between the inner stator and the outer stator is also formed in the same cylindrical shape as the stator.

A coil for generating an induction magnetic field is wound on either one of the inner stator and the outer stator, and a magnet in which magnet poles are arranged along an axial direction of the stator is provided in the mover.

Such a linear motor is disclosed in Korean Registered Patent No. 10-0492615 (hereinafter, Prior Art 1) and Korean Registered Patent No. 10-0539813 (hereinafter, Prior Art 2).

Prior Art 1 and Prior Art 2 disclose a structure in which a plurality of iron cores stamped out into thin plates are radially laminated and formed in a cylindrical shape, and in Prior Art 1, both the inner stator and the outer stator are radially laminated. Prior Art 2 improves Prior Art 1, and discloses a structure in which the inner stator is radially laminated and an arc laminated stator block is radially laminated for the outer stator.

In the foregoing linear motor in the related art, as described above, several hundred sheets of iron cores are separately stamped out and then radially laminated to fabricate an inner stator or an outer stator, but it is difficult to stamp out and radially laminate several hundreds of iron cores, and also difficult to fix them in a cylindrical shape, thereby causing severe difficulties in fabricating the inner stator and the outer stator.

In other words, a large number of iron cores ranging from several hundreds of sheets must be stamped out and fabricated to incur high fabrication cost, and a single sheet of iron core must be radially laminated as well to complicate assembly process and require excessive assembly time, thereby increasing fabrication cost. Furthermore, even when a set of iron cores is bundled with several stator blocks and then the stator blocks are radially laminated, several hundred sheets of iron cores must be not only stamped out and fabricated, but also a single sheet of iron core must be radially laminated, and thus there remain disadvantages in assembly process for assembling the stator and in fabrication cost required therefor.

Furthermore, in order to fix the inner stator and the outer stator so as to maintain a cylindrical shape, when a separate fixing ring is press-fitted or a single sheet of iron core is laminated, there is a problem of causing difficulty in aligning and laminating the positions of the fixing grooves provided in the respective iron cores and also difficult to press-fit and fix the fixing ring into the fixing grooves provided in several hundred sheets of iron cores. Furthermore, when a plurality of iron cores are combined to form stator blocks, the shape of these stator blocks is typically maintained through a caulking operation, but when an area of the iron core is small, the shape of some iron cores is distorted and deformed during the caulking operation, and the iron core cannot be formed in a small size, and due to this, there is limitation in downsizing the motor.

However, in the above-described prior arts, as the magnet is coupled to the mover, a weight of the mover increases to decrease operating frequency. In other words, when a magnet (hereinafter referred to as Nd magnet) having a relatively large magnetic flux amount is applied in order to secure the operating frequency while reducing the weight of the magnet, the fabrication cost of the motor is increased due to a high price per unit area of the Nd magnet. In contrast, when a relatively low-cost ferrite magnet is applied in consideration of the material cost of the magnet, the magnetic flux amount is low due to the characteristics of the ferrite magnet to increase the used amount of magnet, and as a result, there is a problem in that motor efficiency is lowered as operating frequency decreases while increasing the weight of the mover.

Furthermore, in view of these problems, the stator is divided into an inner stator and an outer stator, and a magnet is attached to either one of the inner stator and the outer stator, and then a mover made of a magnetic body is reciprocated between the inner stator and the outer stator. However, in this case, since the mover is provided between the outer stator and the inner stator, air gaps are formed on the outer side and the inner side, respectively, with respect to the mover, resulting in an increase in total air gap, thereby deteriorating motor efficiency.

In addition, a linear compressor using the linear motor as described above still has a problem in the foregoing linear motor, and thus has limitation in downsizing the linear compressor.

SUMMARY

An object of the present disclosure is to provide a transverse flux linear motor capable of easily fabricating a stator or a mover to reduce fabrication cost, and a linear compressor having the same.

Moreover, the present disclosure is to provide a transverse flux type linear motor capable of reducing a number of iron cores constituting the stator or the mover to simplify a lamination operation, and a linear compressor having the same.

In addition, another object of the present disclosure is to provide a transverse flux linear motor capable of increasing motor efficiency while easily fabricating a stator or a mover, and a linear compressor having the same.

Moreover, the present disclosure is to provide a transverse flux type linear motor capable of increasing motor efficiency while reducing the weight of the mover to implement high speed, and a linear compressor having the same.

Moreover, the present disclosure is to provide a transverse flux type linear motor capable of capable of reducing an air gap between the stator and the mover to increase motor efficiency, and a linear compressor having the same.

Furthermore, another object of the present disclosure is to provide a transverse flux type linear motor capable of reducing material cost for magnet, and a linear compressor having the same.

Moreover, the present disclosure is to provide a transverse flux type linear motor capable of maintaining motor efficiency while reducing material cost for magnet using ferrite magnet, and a linear compressor including the same.

Another object of the present disclosure is to provide a transverse flux type linear motor capable of excluding the inner stator to enhance a degree of design freedom in the mover while coping effectively with the flux reduction of the magnet, and a linear compressor having the same.

Furthermore, another object of the present disclosure is to provide a transverse flux linear motor capable of increasing motor efficiency by reducing a weight of the mover to reduce power consumption, and a linear compressor having the same.

Moreover, the present disclosure is to provide a linear motor that reduces a weight of the mover by downsizing an iron core constituting the stator or the mover, and a transverse flux type linear compressor having the same.

In order to achieve the objective of the present disclosure, there is provided a transverse flux type linear motor, including a stator core in which a plurality of stator sheets are laminated along an axial direction; a winding coil provided in the stator core to form an alternating magnetic flux in a transverse direction perpendicular to the axial direction in the stator core; a plurality of magnets fixedly coupled to a radial side surface of the stator core to have different magnetic poles alternately arranged along the axial and circumferential directions; and an integral mover provided with a radial air gap with respect to the plurality of magnets to reciprocate in an axial direction with respect to the stator core by a magnetic force formed on the magnet.

Here, at least a part of the integral mover may be formed of a magnetic body to form a magnetic path through which magnetic flux passing through the magnet moves in the stator core.

Furthermore, the integral mover may include a mover body portion formed in an annular shape; and at least one or more core protrusion portions protruded in a radial direction on an inner circumferential surface of the mover body portion, and formed at a position corresponding to a transverse air gap in a radial direction between the magnets.

Furthermore, a circumferential length of the core protrusion portion may be greater than or equal to that of the transverse air gap.

Here, a radial thickness of the integral mover may be smaller or equal to a portion wound with the winding coil in the stator core.

Here, the integral mover may formed by laminating a plurality of electrical sheets along an axial direction.

Here, the integral mover may be formed as a single body by sintering or molding a material made of a magnetic body.

Here, the integral mover may be formed smaller than an axial length of the magnet, and formed larger than or equal to ½.

Here, the stator core may include a plurality of stator core blocks with a transverse air gap therebetween, and the plurality of stator core blocks may be respectively formed with tooth portions with the transverse air gap therebetween, and the magnet may be respectively fixed to each of the tooth portions.

Furthermore, the integral mover may be formed in an annular shape, and a core protrusion portion protruded in a radial direction may be formed on an inner circumferential surface of the integral mover corresponding to the plurality of transverse air gaps.

Furthermore, winding coils may be provided between the plurality of stator core blocks, respectively, and the plurality of winding coils may be connected in series.

In addition, in order to achieve the objective of the present disclosure, there is provided a linear compressor, including a case having an inner space; a linear motor disposed in an inner space of the case, in which an integral mover reciprocates; a piston coupled to the integral mover of the linear motor to reciprocate together; a cylinder into which the piston is inserted to form a compression space; a suction valve configured to open and close a suction side of the compression space; and a discharge valve configured to open and close a discharge side of the compression space, wherein the linear motor comprises the above-described transverse flux type linear motor.

Here, a connecting protrusion portion may be formed on an inner circumferential surface of the integral mover, and a connecting member may be coupled to the connecting protrusion portion by a bolt or rivet, and the piston may be coupled to the connecting member.

Here, the integral mover may be embedded in and coupled to a connecting member, and the connecting member may be coupled to the piston.

Furthermore, a connecting protrusion portion may be formed on an inner circumferential surface of the integral mover, and a connecting hole may be formed on the connecting protrusion portion, and a part of the connecting member may be passed through the connecting hole to fix the integral mover to the connecting member.

In a transverse flux type linear motor according to the present disclosure, an iron core constituting the stator core may be laminated in an axial direction, thereby easily fabricating the stator. Through this, the number of iron cores may be reduced to simplify the lamination operation and reduce the fabrication cost. Furthermore, it may be possible to secure a space in which the iron cores constituting the stator can be laminated and fixed. As a result, it may be possible to downsize the stator, and reduce the size and weight of the entire motor.

Furthermore, in the transverse flux type linear motor according to the present disclosure, as the magnet is coupled to the stator, the weight of the mover is reduced to increase the operating frequency of the mover. Through this, it may be possible to reduce operating frequency to increase motor efficiency while at the same time reducing power consumption to increase motor efficiency.

Furthermore, in the transverse flux type linear motor according to the present disclosure, as the magnet is coupled to the stator, the mover may perform the role of a type of inner stator. Accordingly, an additional inner stator may not be required to reduce material cost. In addition, the number of radial air gaps may be reduced by excluding the inner stator, thereby reducing magnetic flux leakage and improving motor efficiency.

Furthermore, in the transverse flux type linear motor according to the present disclosure, ferrite magnet may be used as a magnet to reduce material cost for the magnet, thereby implementing the reduction of fabrication cost.

Furthermore, as the foregoing linear motor is provided, it may be possible to provide a downsized and lightweight linear compressor.

Furthermore, in the case of the above linear motor, it may be possible to facilitate air gap management by the application of an integral mover which does not require the inner stator. Accordingly, concentricity between the piston and the cylinder may be easily matched to reduce friction loss between the cylinder and the piston, thereby improving the reliability of the compressor and improving the efficiency.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Hereinafter, a transverse flux type linear motor according to the present disclosure and a linear compressor having the same will be described in detail with reference to an embodiment illustrated in the accompanying drawings.

Figure 1:
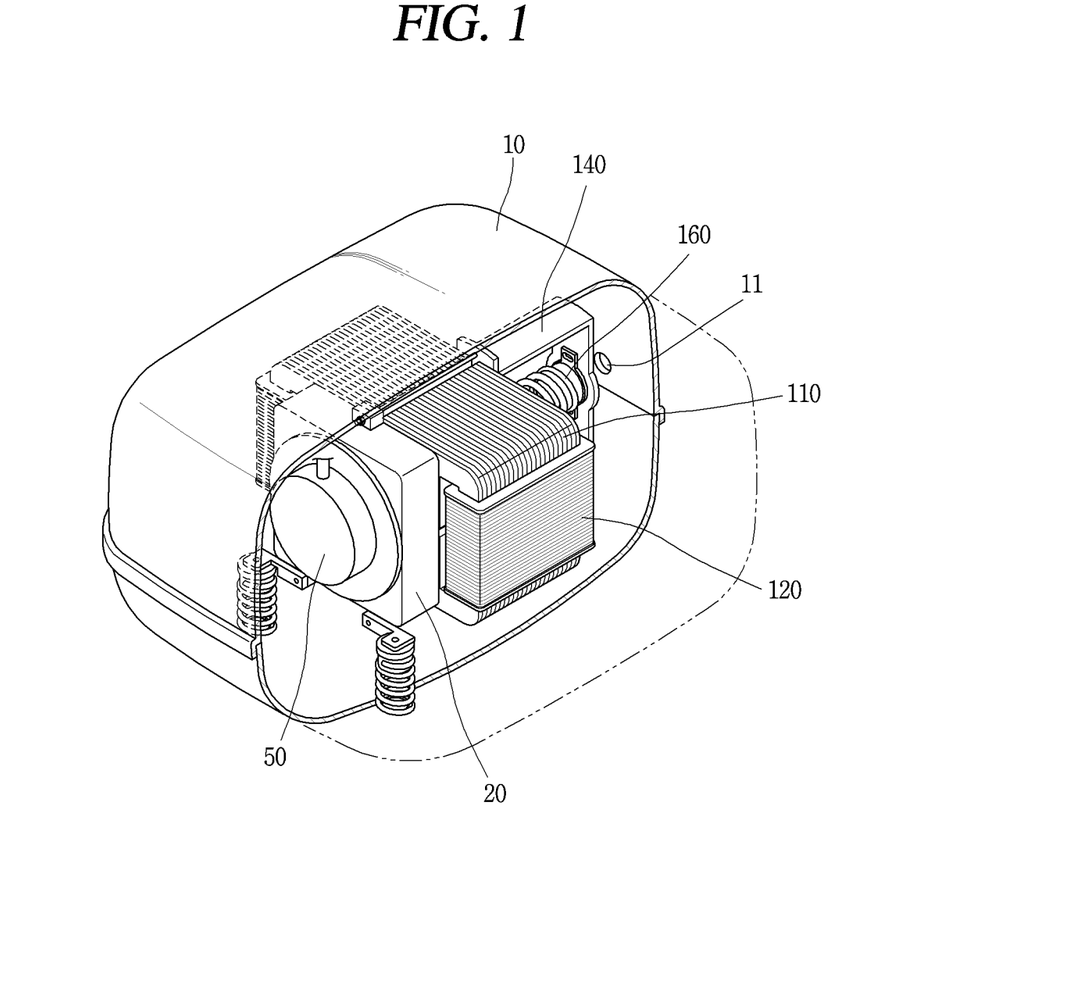
FIG. 1 is a broken perspective view showing a linear compressor provided with a linear motor according to an embodiment of the present disclosure.

The transverse flux type linear motor (hereinafter, abbreviated as a linear motor) 100 according to the present embodiment may be applied to a linear compressor in which a piston sucks, compresses and then discharge refrigerant while reciprocating in a cylinder. FIG. 1 is a broken perspective view showing a linear compressor provided with a linear motor according to an embodiment of the present disclosure, and FIG. 2 is a cross-sectional view showing an inside of the linear compressor according to FIG. 1.

Figure 2:
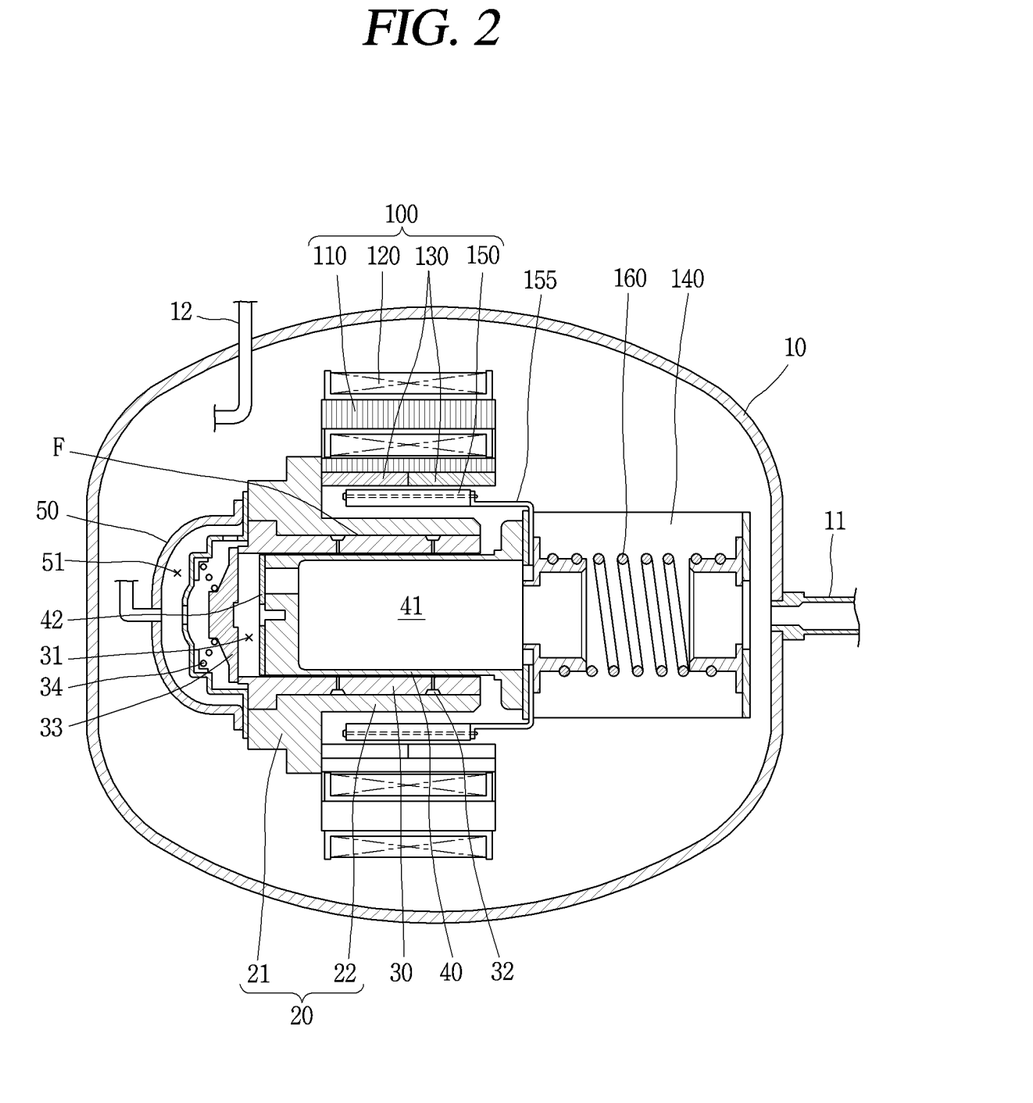
FIG. 2 is a cross-sectional view showing an inside of the linear compressor according to FIG. 1.

As illustrated in FIGS. 1 and 2, in the linear compressor according to the present embodiment, a suction pipe 11 is connected to an inner space of a sealed case 10, and a discharge pipe 12 for guiding refrigerant compressed in a compression space 31 of a cylinder 30, which will be described later, to a cooling cycle is connected to one side of the suction pipe 11. As a result, the inner space of the case 10 is filled with sucked refrigerant to form a suction pressure, and refrigerant discharged from the compression space 31 is discharged directly to an outside of the case 10 through the discharge pipe 12 toward a condenser.

A frame 20 is provided in the inner space of the case, and a linear motor 100 capable of generating a reciprocating force while at the same time inducing a resonance motion of a piston 40 which will be described later is fixedly coupled to one side surface of the frame 20. The linear motor will be described later in detail.

The compression space 31 is provided inside the linear motor 100, and provided with a cylinder 30 inserted into and coupled to the frame 20. An outer circumferential surface of the cylinder 30 is spaced from an inner circumferential surface of the linear motor 100. This is because, as an integral mover 150 replaces the role of the inner stator without providing an additional inner stator inside the linear motor 100 which will be described later, an outer circumferential surface of the cylinder 30 and an inner circumferential surface of the linear motor 100 are inevitably separated from each other to allow the integral mover 150 to perform relative movement with respect to the cylinder 30.

Accordingly, the frame 20 is formed in an annular shape having a cylinder insertion portion 21 at the center, and a cylinder support portion 22 extended from a rear surface of the frame (hereinafter, the discharge side is referred to as a front side, and the suction side is referred to as a rear side) to support the cylinder 30 in a radial direction may be protruded around the cylinder insertion portion 21. A bearing inlet (not shown) constituting an inlet of a gas bearing is formed around the cylinder insertion portion 21, and a bearing path (F) communicating with the bearing inlet is formed between an inner circumferential surface of the cylinder support portion 22 and an outer circumferential surface of the cylinder 30. However, when a thickness of the frame 20 is sufficiently large or a void between the cylinder 30 and the piston 40 is supported by an additional bearing element, it may not be required to additionally form the cylinder support portion 22.

On the other hand, the frame 20 supports the cylinder 30 while at the same time tightening a pair of two stators 110 together with a back cover 140 such that the stators 110 can be supported in a state having a radial air gap (A) and transverse air gaps (B1-B4) which will be described later. Therefore, the frame 20 requires a fastening protrusion portion protruded radially beyond an outer surface of the stator 110 to fasten the back cover 140 thereto with the bolt 145. In view of this, the frame may be divided into a plurality of pieces, and composed of a first frame for securing a pair of two stators and a second frame provided with a fastening protrusion portion to be fastened with the back cover. However, it is more preferable that the first frame and the second frame are combined to form one frame 20 configured with a single body, and a plurality of fastening protrusion portions 21a are formed on an outer surface of the cylinder insertion portion 21.

The cylinder 30 is formed in a cylindrical shape having the compression space 31. However, the cylinder 30 may be formed with a bearing hole 32 communicating with the foregoing bearing path (F) to pass therethrough in a radial direction. A plurality of groups of the bearing holes 32 may be formed at intervals in a reciprocating direction (axial direction) of the piston 40, and a plurality of bearing holes 32 may be formed at intervals along a transverse air gap for each group. Each of the bearing holes 32 may be formed individually, or a plurality of the bearing holes 32 may be formed so as to communicate with an annular groove. Furthermore, each of the bearing holes 32 is provided with a fine nozzle portion, and a foreign matter filter may be provided in front of the nozzle portion.

The piston 40 is coupled to an inside of the cylinder 30 reciprocally inserted into the cylinder 30. The piston 40 is coupled to the integral mover 150 of the linear motor 100 which will be described later to vary a volume of the compression space 31 so as to compress refrigerant while reciprocating.

The piston 40 is formed in a cylindrical shape to have a suction passage 41 therein. A suction valve 42 for opening and closing a suction passage 41 of the piston 40 is coupled to a front-end surface of the piston 40, and a discharge valve 33 for opening and closing the compression space 31 of the cylinder 30 is accommodated in a discharge cover 50 and detachably coupled to a front end surface of the cylinder 30.

The discharge cover 50 is provided with a discharge space 51 and fixedly coupled to the cylinder 30. The discharge valve 33 and a valve spring 34 for supporting the discharge valve 33 are accommodated in the discharge space 51 of the discharge cover 50, and an inlet of the gas bearing formed in the frame 20 is accommodated therein.

On the other hand, the linear motor 100 includes a stator 110 supported by the frame 20 to form a transverse magnetic flux and an integral mover 150 provided inside the stator 110 to reciprocate in a longitudinal direction by the transverse magnetic flux.

The stator 110 includes a plurality of stator cores 110a, 110b arranged along a transverse direction, a winding coil 120 coupled to the plurality of stator cores 110a, 110b, respectively, to generate an alternating magnetic flux by receiving an alternating current, and a plurality of magnets 130 fixedly coupled to inner circumferential surfaces of the plurality of stator cores 110a, 110b to form a longitudinal magnetic flux. The integral mover 150 is located inside the magnet 130 and the piston 40 is coupled thereto. The linear motor according to the present embodiment is constructed such that the mover performs the role of an inner stator except for the inner stator, and detailed description thereof will be made later.

The foregoing linear compressor according to this embodiment operates as follows.

In other words, when an alternating current is applied to the winding coils 120 of the linear motor 100, an alternating magnetic flux is formed between the stator cores 110a, 110b, the magnet 130, and the integral mover 150.

Then, the integral mover 150 spaced apart by an air gap from an inner side of the stator 110, more precisely, an inner side of the magnet 130, reciprocates in a direction perpendicular to the magnetic flux direction formed in the stator 110.

Then, a series of process in which the piston 40 coupled to the integral mover 150 sucks and compress refrigerant while reciprocating inside the cylinder 30, and the compressed refrigerant is discharged into the discharge space 51 while opening the discharge valve 33 are repeated.

In the linear compressor according to the present embodiment as described above, the integral mover coupled to the piston may be decreased in weight as a heavy magnet is coupled to the stator. Accordingly, the integral mover allows a high-speed operation by shortening the operating frequency, and thus ferrite magnet having a low residual magnetic flux density but being very inexpensive compared to Nd magnet may be used for the magnet.

Here, since the ferrite magnet has a low residual magnetic flux density due to its characteristics, it has a lower alpha per turn compared to Nd magnet, and thus a magnetic circuit generating a large magnetic spring is not required. Therefore, the linear motor according to the present embodiment eliminates the need for the inner stator to allow the integral mover, and the performance of the compressor as a whole may be improved due to the application of the integral mover.

Moreover, due to the application of the integral mover that does not require the inner stator, only one air gap may be generated between an inner circumferential surface of the magnet and outer circumferential surface of the mover to facilitate air gap management to that extent, thereby allowing concentricity between the piston connected to the integral mover and the cylinder coupled to the piston to be easily matched.

On the other hand, in the linear motor according to the present embodiment, as described above, the stator is composed only of the outer stator, and the inner stator is excluded, and the integral mover performs the role of the inner stator. In addition, the magnet is fixedly coupled to the stator, and the magnets are arranged so as to have different polarities in an axial direction while at the same time the neighboring magnets with a transverse air gap are alternately arranged so that the polarities are opposite to each other, the integral mover may reciprocate even when the inner stator is excluded. Here, in order to allow the integral mover to be coupled to the piston to perform a resonant motion, an additional resonant spring formed of a compression coil spring may be further provided.

Furthermore, the stator is divided into a plurality of stators, and winding coils connected in series may be respectively coupled to each stator. At this time, the winding coil may be coupled to each stator in a state where the coil is wound on a separate bobbin or the coil may be wound on each stator. Each stator is divided into two stator blocks again to be coupled at both sides of each winding coil in a structure in which the coil is wound on a separate bobbin, and each stator may be formed as a single body in a structure in which the coil is wound on the stator. Hereinafter, description will be focused on an example in which each stator is divided into four stator blocks, and a pair of two stator blocks are inserted into and coupled to both sides of each winding coil to form one stator.

Figure 3:
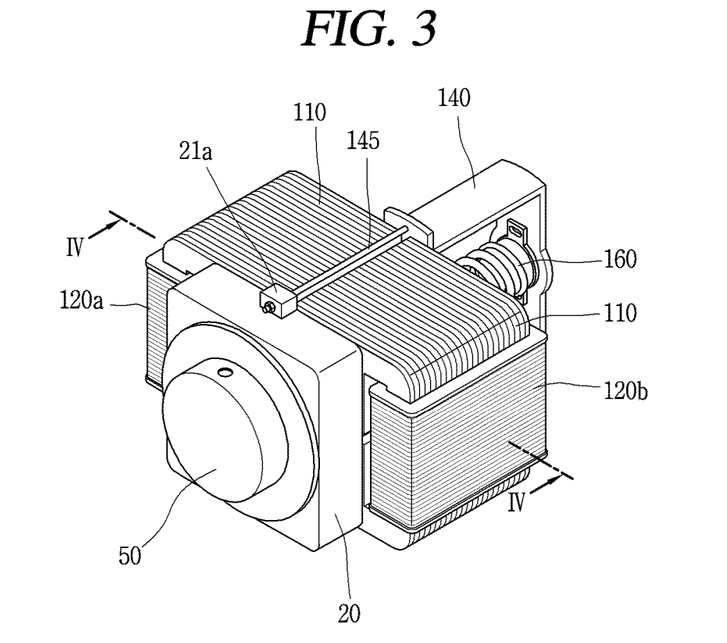
FIG. 3 is a perspective view showing a compressor body in the linear compressor according to FIG. 1.
Figure 4:
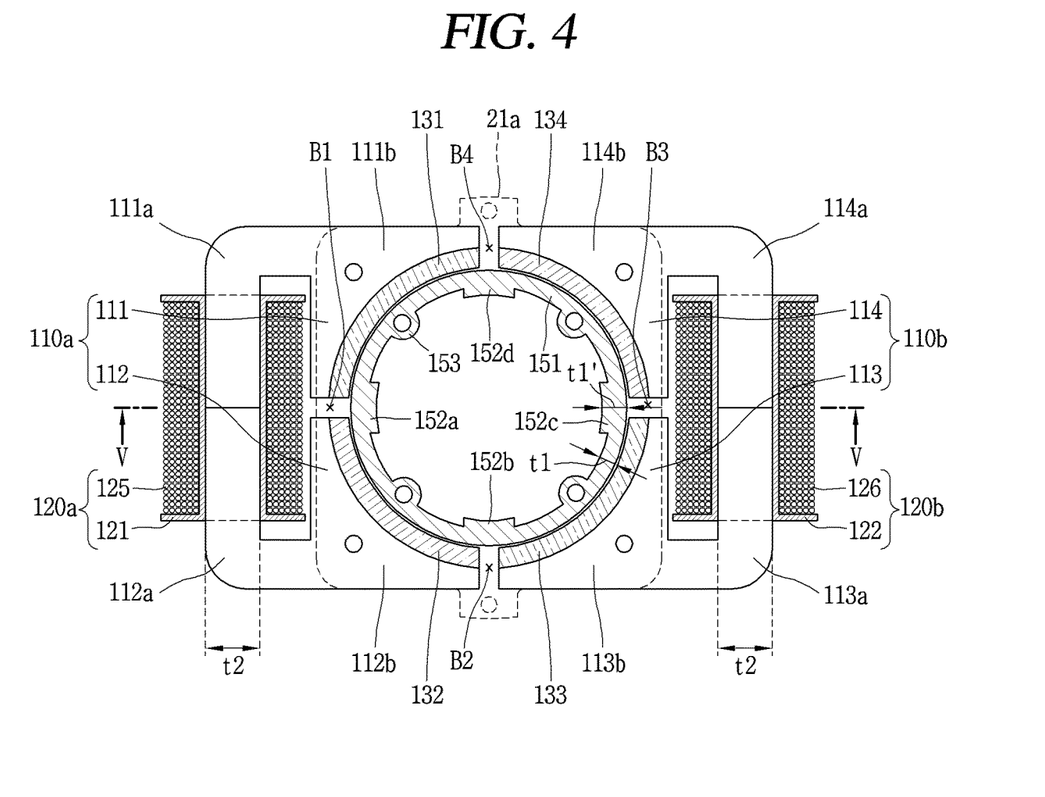
FIG. 4 is a cross-sectional view taken along line "IV-IV" in FIG. 3.
Figure 5:
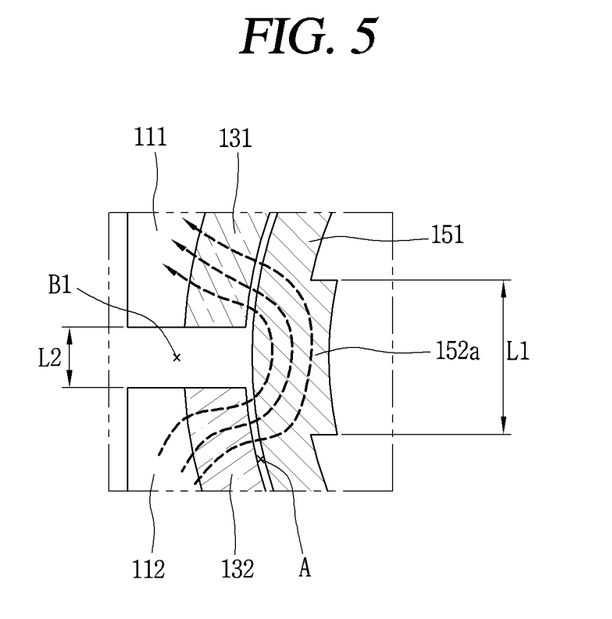
FIG. 5 is a schematic view for explaining a state in which magnetic flux moves between both magnets and an integral mover in FIG. 4.
Figure 6:
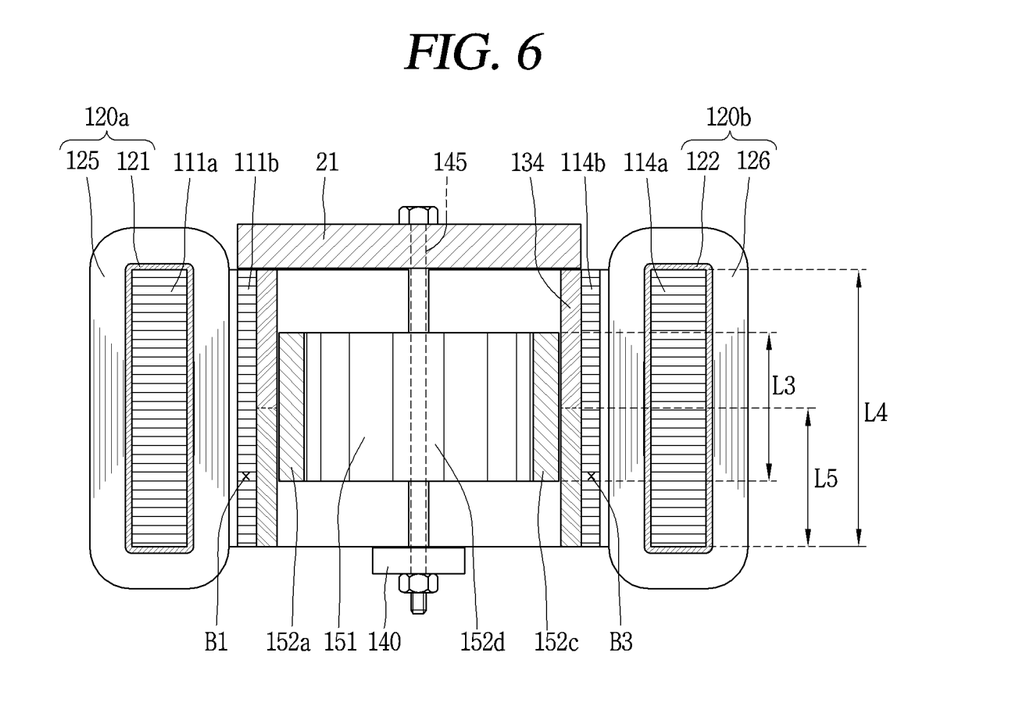
FIG. 6 is a cross-sectional view taken along line "V-V" in FIG. 5.

FIG. 3 is a perspective view showing a compressor body in the linear compressor according to FIG. 1, and FIG. 4 is a cross-sectional view taken along line "IV-IV" in FIG. 3, and FIG. 5 is a schematic view for explaining a state in which magnetic flux moves between both magnets and an integral mover in FIG. 4, and FIG. 6 is a cross-sectional view taken along line "V-V" in FIG. 5.

As illustrated in the drawing, the linear motor 100 according to the present embodiment may include a stator 110 including a plurality of stator cores 110a and 110b arranged in a transverse direction, and an integral mover 150. The integral mover 150 may be inserted into the stator 110 with a radial air gap (A) therebetween.

The stator 110 includes a first stator core 110a and a second stator core 110b which are separated from each other. However, the stator 110 is not limited to two stator cores, but may be divided into two or more stator cores.

The first stator core 110a and the second stator core 110b are formed symmetrically with respect to each other about a vertical axis in the drawing, and a stator that combines the first stator core 110a and the second stator core 110b forms transverse air gaps (B2, B4) since the stator core 110a and the second stator core 110b are spaced apart from each other in a transverse direction. However, the first stator core 110a and the second stator core 110b may form a yoke portion in a rectangular ring shape as a whole. The first stator core 110a and the second stator core 110b are formed symmetrically with respect to each other, and in the following description, the first stator core 110a will be mainly described and the second stator core 110b will be briefly described or substituted by the description of the stator core 110a.

The first stator core 110a may include a first stator core block 111 and a second stator core block 112 coupled to each other with the first winding coil 120a therebetween. The first stator core block 111 and the second stator core block 112 are spaced apart from each other in a transverse direction at a tooth portion which will be described later to form a transverse air gap (B1) but are coupled to each other at a yoke portion to which the winding coil is coupled to form a transverse magnetic path.

Here, the first stator core block 111 and the second stator core block 112 may be respectively formed by laminating a single sheet of thin stator in a motion direction (axial direction, longitudinal direction) of the integral mover.

Furthermore, the first stator core block 111 and the second stator core block 112 are symmetrically formed about a horizontal axis in the drawing. Accordingly, when the first stator core 110a and the second stator core 110b are combined to form four stator core blocks, they are formed symmetrically about the vertical and horizontal axes of the drawing, respectively, two stator core blocks coupled to each other [111, 112] [113, 114] respectively form a first stator core (left stator core in the drawing) 110a and a second stator core (right stator core in the drawing) 110b.

The first stator core block 111 includes a first yoke portion 111a and a first tooth portion 111b, and the second stator core block includes a second yoke portion 112a and a second tooth portion 112b. The linear motor according to the present embodiment is different from a typical motor in that a winding coil is mounted on a yoke portion.

For example, as shown in FIG. 4, the first yoke portion 111a and the second yoke portion 112a are joined to each other in such a way that end portions thereof correspond to each other, but an end portion of the first yoke portion 111a and an end portion of the second yoke portion 112a are inserted into the first winding coil 120a and then joined thereto so as to form a single yoke portion of the first stator core 110a.

In other words, for the first stator core 110a, the first yoke portion 111a and the second yoke portion 112a are inserted from both sides of the first winding coil 120a and connected to each other, and accordingly, the first yoke portion 111a of the first stator core block 111 and the second yoke portion 112a of the second stator core block 112 constituting the first stator core 110a form a closed loop.

This will be also applicable to the second stator core 110b. In other words, a third yoke portion 113a constituting the third stator core block 113 and a fourth yoke portion 114a constituting the fourth stator core block 114 are inserted from both sides of the second winding coil 120b and connected to each other, and accordingly, the third state core block 113 and the fourth stator core block 114 constituting the second stator core 110b form a closed loop.

For the first winding coil 120a and the second winding coil 120b, a first coil 125 and a second coil 126 are respectively wound on the first bobbin 121 and the second bobbin 122 in a rectangular barrel shape, and then the first yoke portion 111a and the second yoke portion 112a and the third yoke portion 113a and the second yoke portion 112b are respectively inserted into the openings of both the first bobbin 121 and the second bobbin 125 to form the first stator core 110a and the second stator core 110b. Of course, the first winding coil 120a and the second winding coil 120b may be formed in a rectangular barrel shape without an additional bobbin, and then a yoke portion of the respective stator core blocks [111, 112][113, 114] may be inserted into both ends of the respective winding coils 120a, 120b to form the first stator core 110a and the second stator core 110b.

Although the first winding coil 120a and the second winding coil 120b may be connected in parallel, in this case, voltage for forming a magnetic flux may be halved to ½. Therefore, in order to maximize a counter electromotive force, it is preferable to connect the first winding coil 120a and the second winding coil 120b in series rather than in parallel.

On the other hand, a first tooth portion 111b may be formed in the first yoke portion 111a, a second tooth portion 112b in the second yoke portion 112a, a third tooth portion 113b in the third yoke portion 113a, and the fourth tooth portion 114b in the fourth yoke portion 114a, respectively, in a radial direction toward the center thereof. Accordingly, the first tooth portion 111b and the second tooth portion 112b are spaced apart from each other to form a semicircle, and the third tooth portion 113b and the fourth tooth portion 114b are spaced apart from each other to form an opposite semicircle.

Furthermore, the first tooth portion 111b and the fourth tooth portion 114b, the second tooth portion 112b and the third tooth portion 113b are also spaced apart from each other so that the first tooth portion 111b, And the portions 114b are separated from each other by ¼ circle. Accordingly, a first transverse air gap (B1) may be formed between the first tooth portion 111b and the second tooth portion 112b, a second transverse air gap (B2) between the second tooth portion 112b and the third tooth portion 113b, a third transverse air gap (B3) between the third tooth portion 113b and the fourth tooth portion 114b, and a third transverse air gap (B4) between the fourth tooth portion 114b and the first tooth portion 111b, respectively.

In addition, a first magnet 131 may be attached and coupled to an inner circumferential surface of the first tooth portion 111b, and a second magnet 132 to an inner circumferential surface of the second tooth portion 112b, a third magnet 133 to an inner circumferential surface of the third tooth portion 113b, and a fourth magnet 134 to an inner circumferential surface of the fourth tooth portion 114b, respectively. The magnets each have a lower residual magnetic flux density than the Nd magnet but may be made of ferrite magnets that are less expensive.

The N-pole and the S-pole or the S-pole and the N-pole of the magnets 131, 132, 133, 134 may be alternately arranged at the same height in an axial direction along the axial direction. To this end, the first magnet 131 may be formed with an opposite magnetic pole to the second magnet 132, the second magnet 132 to the third magnet 133, the third magnet 133 to the fourth magnet 134, and the fourth magnet 134 to the first magnet 131, respectively.

For example, when the first magnet 131 attached to the first tooth portion 111*b* is N-S arranged from the front to the rear, the second magnet 132 attached to the second tooth portion 112*b* is S-N arranged from the front to the rear. Accordingly, when the first magnet 131 is an N-S pole in an axial direction, the second magnet 132 is magnetized to an S-N pole, the third magnet 133 to an N-S pole, and the fourth magnet 134 to an S-N pole, respectively. Of course, the aforementioned first transverse air gap (B1) is formed between the first magnet 131 and the second magnet 132, the second transverse air gap (B2) between the second magnet 132 and the third magnet 133, the third transverse air gap (B3) between the third magnet 133 and the fourth magnet 134, and the fourth transverse air gap (B4) between the fourth magnet 134 and the first magnet 131, respectively.

Furthermore, the magnet may be formed to have the same length as an axial length of the stator cores 110*a*, 110*b*. Accordingly, magnetic fluxes formed in a transverse direction in the yoke portions 111*a*, 112*a*, 113*a*, 114*a* of the respective stator cores 110*a*, 110*b* may efficiently move to the magnets 131, 132, 133, 134.

Meanwhile, as shown in FIG. 4, the integral mover 150 may be formed to perform the role of the mover while performing the role of the inner stator at the same time. Accordingly, the integral mover 150 may be made entirely of a magnetic body. Of course, for the integral mover 150, the transverse air gaps (B1, B2, B3, B4) are formed between the first magnet 131 and the second magnet 132, between the second magnet 132 and the third magnet 133, between the third magnet 133 and the fourth magnet 133, and between the fourth magnet 134 and the first magnet 131, respectively, and thus part of a portion corresponding to the transverse air gaps may be formed of a nonmagnetic body. However, in this case, a flux movement to some of the neighboring magnets is blocked, and flux saturation may occur due to the concentration of flux to the other non-blocked magnets. In order to prevent such flux saturation, a thickness of the integral mover must be increased in a radial direction, but due to this, a weight of the integral mover may increase the operation frequency, which is disadvantageous for increasing the speed. Therefore, in the transverse flux type motor as in the present embodiment, it may be preferable that the entire integral mover is formed of a magnetic body to allow magnetic flux to efficiently move, thereby preventing flux saturation.

In addition, the integral mover 150 may be formed in a cylindrical shape having a predetermined axial length by laminating an annular thin electrical sheets in an axial direction. However, in some cases, the magnetic material may be formed into a single cylindrical shape by sintering or molding the magnetic body material by a predetermined axial length.

For the integral mover 150 according to the present embodiment, an outer circumferential surface of the mover body portion 151 is formed in a rounded shape, and located on an inner circumferential surface of the magnet 130 coupled to the stator 110 with a radial air gap (A) therebetween. Accordingly, the linear motor 100 according to the present embodiment has only one radial gap (A) in a radial direction.

Furthermore, as shown in FIGS. 4 and 5, a plurality of core protrusion portions 152*a*, 152*b*, 152*c*, 152*d* may be formed on an inner circumferential surface of the mover body portion 151. The core protrusion portions 152*a*, 152*b*, 152*c*, 152*d* may be formed to correspond to transverse air gaps (B1, B2, B3, B4). In other words, as in the present embodiment, four core protrusion portions may also be formed when there are four transverse air gaps. In addition, the core protrusion portions 152*a*, 152*b*, 152*c*, 152*d* may be formed to correspond to transverse air gaps (B1, B2, B3, B4). Accordingly, a portion other than the core protrusion portions 152*a*, 152*b*, 152*c*, 152*d* may form a weight reduction portion (not shown) in which a thickness (radial length) of the mover body portion 151 is smaller than a portion where the core protrusion portion is formed.

Moreover, a thickness (t1) of the mover body portion 151 in which the core protrusion portions 152*a*, 152*b*, 152*c*, 152*d* are not formed is formed smaller than a thickness (t2) of the yoke portions 111*a*, 112*a*, 113*a*, 114*a* constituting the outer stator. Since a flux density when a flux generated from the stator 110 passes through the integral mover 150 becomes ½ of a flux density generated from the stator, the thickness (t1) of the mover body portion at a portion where the core protrusion portions 152*a*, 152*b*, 152*c*, 152*d* are not formed, that is, the weight reduction portion, may be formed smaller than the thickness (t2) of the yoke portion. Of course, a thickness (t1') of a portion where the core protrusion portions 152*a*, 152*b*, 152*c*, 152*d* are formed may be formed smaller than the thickness (t2) of the yoke portion. Accordingly, a weight of the integral mover 150 as a whole may be reduced, which is advantageous for increasing the speed.

In addition, a circumferential length (L1) of the core protrusion portions 152*a*, 152*b*, 152*c*, 152*d* may be formed larger than a circumferential length (L2) of the transverse air gaps (B1, B2, B3, B4). Accordingly, magnetic fluxes may efficiently move between the neighboring magnets 131, 132, 133, 134 with the transverse air gaps (B1, B2, B3, B4) therebetween) through the core protrusion portions 152*a*, 152*b*, 152*d*, 152*d*.

Furthermore, connecting member fixing portions 153 may be formed on an inner circumferential surface of the mover body portion 151 at a predetermined interval. The connection member fixing portions 153 may be formed between the core protrusion portions 152*a*, 152*b*, 152*c*, 152*d* described above. Accordingly, when the linear motor 100 according to the present embodiment is applied to a linear compressor, and the integral mover 150 of the linear motor 100 is coupled to a connecting member 155 connected to the piston 40 of the linear compressor, the connecting member 155 may be fastened to a through hole 153*a* of the connecting member fixing portion 153 with a bolt 156.

Furthermore, as shown in FIG. 6, an axial length (L3) of the mover body portion 151 may be formed smaller than an axial length (L4) of the stator or the magnet. For example, an axial length (L3) of the mover body portion 151 is set in consideration of a stroke length of the integral mover 150, and thus may be formed substantially smaller than or equal to a half-length (L5) of each magnet 130.

Figure 7:
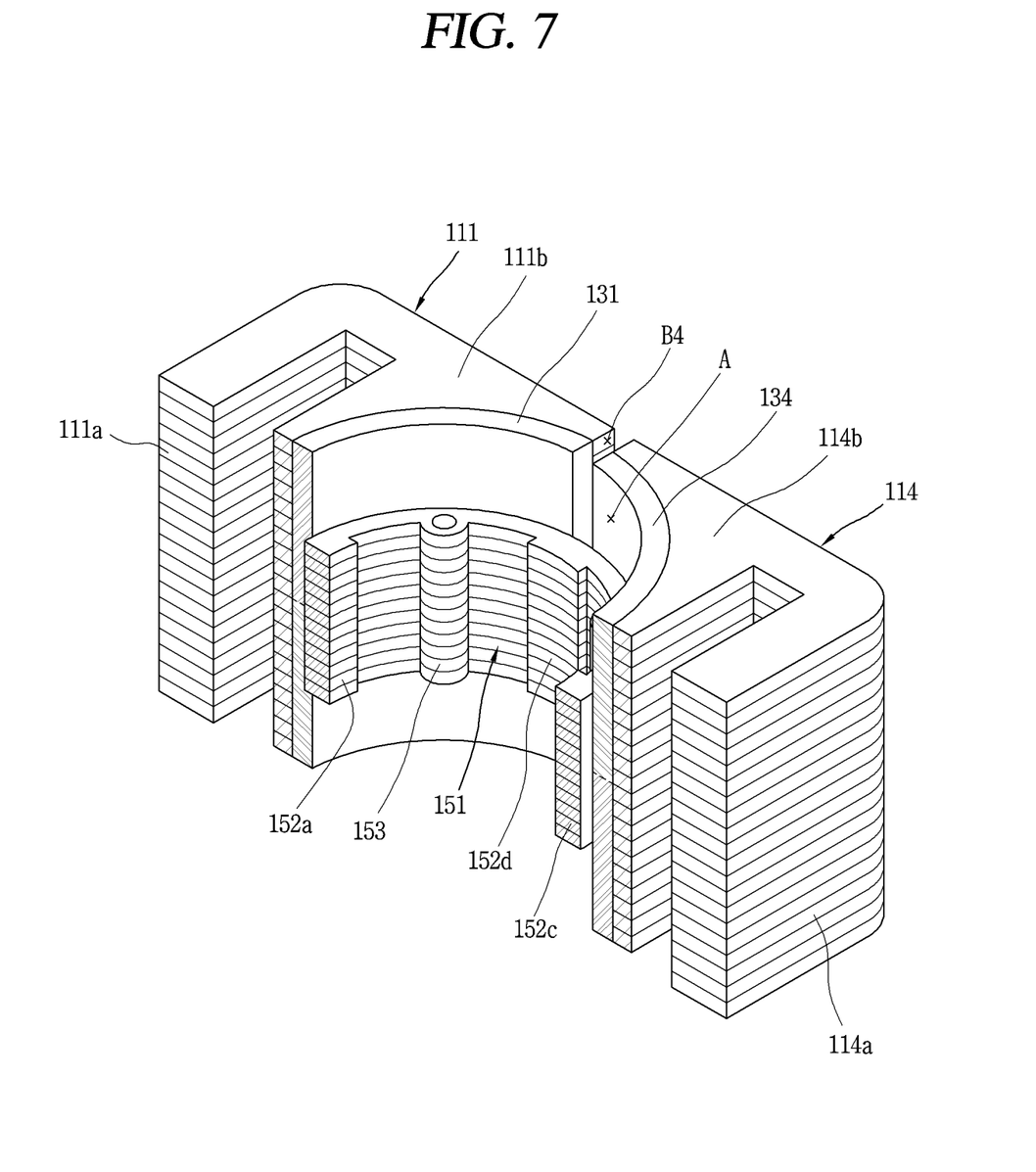
FIG. 7 is a broken perspective view shown a linear motor having an integral mover according to the present embodiment.
Figure 8A:
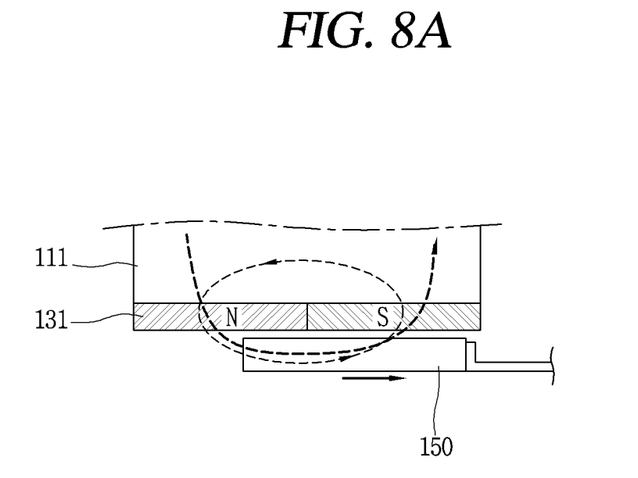
FIGS. 8A and 8B are schematic views for explaining an operation in which the integral mover reciprocates in FIG. 7.
Figure 8B:
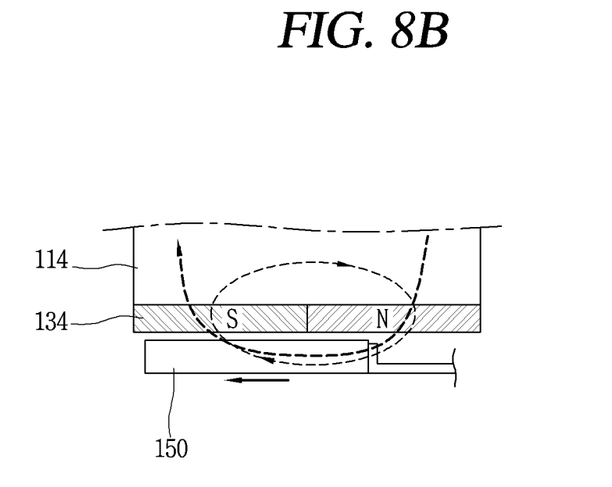

The operational effect of the foregoing linear motor according to the present disclosure is as follows. FIG. 7 is a broken perspective view shown a linear motor having an integral mover according to the present embodiment, and FIGS. 8A and 8B are schematic views for explaining an operation in which the integral mover reciprocates in FIG. 7.

In other words, when alternating current is applied to the first winding coil 120*a* and the second winding coil 120*b*, an alternating magnetic flux generated by each of the winding coils 120*a*, 120*b* is formed on the first stator core 110*a* and the second stator core 110*b* constituting a pair of two magnetic paths. At this time, as the first winding coil 120a and the second winding coil 120b are connected in series, the alternating magnetic fluxes of the first stator core 110a and the second stator core 110b are formed in the same direction, and the magnetic fluxes form a transverse magnetic flux in a direction orthogonal to a motion direction of the integral mover 150.

For example, in the first stator core 110a, when a magnetic flux generated by the first winding coil 120a reaches an inner circumferential surface of the first tooth portion 111b, the magnetic flux passes through an opposite polarity (the upper portion is an S-pole in the drawing) and moves to the mover body portion 151 of the integral mover 150.

Then, part of the magnetic flux moving to the mover body portion 151 moves in an counterclockwise direction through the mover body portion 151, and passes through an opposite polarity of the neighboring second magnet 132 and moves to the second tooth portion 112b. AT this time, part of the magnetic flux passing through the third tooth portion 113b and the third magnet 133 constituting the second stator core 110b is merged into a flux that has passed through the first magnet 131 while moving in a clockwise direction of the drawing and passes through the second magnet 132, and moves to the second tooth portion 112b. It will be also applicable to the second stator core 110b. In other words, the rest of the magnetic flux passing through the first magnet 131 and moving to the mover body portion 151 from the first tooth portion 111b passes through an opposite polarity of the fourth magnet 134 and moves to the fourth tooth portion 114b.

Then, the magnetic flux moving to the second tooth portion 112b forms a clockwise magnetic flux in the first stator core 110a while moving again to the first tooth portion 111b through the first yoke portion 111a, On the contrary, in the second stator core 110b, a magnetic flux in a clockwise direction is formed through a path similar to the first stator core 110a described above, and eventually an alternating magnetic flux is formed while the foregoing direction of the magnetic flux is reversed according to a current applied to the first stator coil 120a and the second stator coil 120b.

Then, a magnetic force due to a type of alternate magnetic pole is formed in each or the tooth portions (or air gaps) 111b to 114b by the alternating magnetic flux.

Then, each of the magnets 131 to 134 attached to each of the teeth portions 111a to 114b forms a thrust or restoring force together with a magnetic force according to the polarity of each of the teeth portions 111b to 114b to form a type of transverse flux type linear motor 100 in which the integral mover 150 reciprocates in a direction orthogonal to the alternating magnetic flux.

As described above, in this embodiment, as the magnet is coupled to the stator constituting the outer stator, the integral mover 150 located inside the magnet forms a type of inner stator. Accordingly, since a thickness of the integral mover 150 can be reduced, the operating frequency of the integral mover may be reduced while applying ferrite magnet, thereby implementing high speed operation. This is because, when the linear compressor is constituted by connecting the piston to the integral mover, the weight of the vibrating body including the piston may be reduced to accelerate the reciprocating motion of the piston.

Furthermore, as the magnet is coupled to the stator and the integral mover forms a type of inner stator, a radial air gap of the linear motor is created only between the magnet and the integral mover. As a result, not only the efficiency of the linear motor may be increased, but also air gap management between the stator and the integral mover may be facilitated to improve assemblability. This is because, when the linear compressor is constituted by connecting the piston to the integral mover, concentricity between the cylinder and the piston may be easily matched to improve assemblability, and friction loss between the cylinder and the piston that can be generated during start-up may be reduced even when the gas bearing is applied.

Furthermore, as the integral mover plays the role of the inner stator at the same time, an additional inner stator may not be required, and due to this, a large free space may be secured on an inner circumferential surface of the integral mover. Accordingly, when the linear compressor is constituted by enlarging a thickness of the integral mover in an appropriate range to secure an area of magnetic path in order to cope with flux reduction that can be generated in the case where the ferrite magnet is applied, or by connecting the piston to the integral mover, it may be possible to increase an outer diameter of the cylinder to increase the capacity of the compressor or shorten the axial length compared to the same compression space volume.

Figure 9:
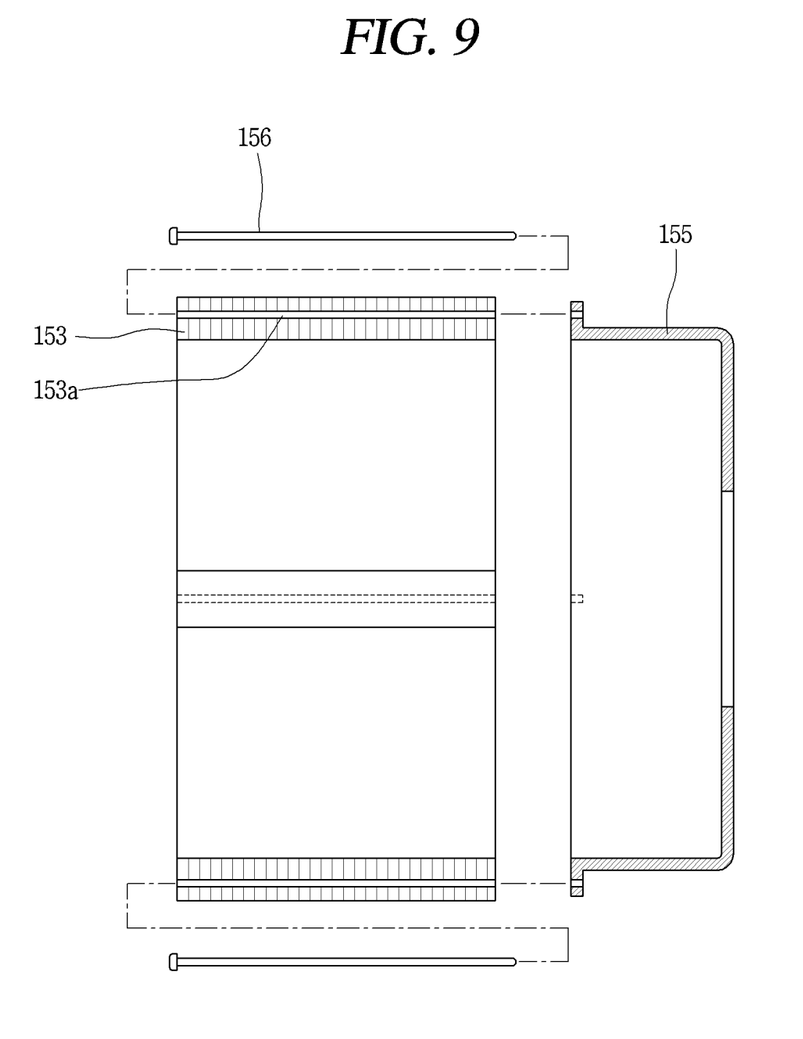
FIG. 9 is a cross-sectional view showing a coupling structure of a connecting member for connecting an integral mover of the linear motor according to the present embodiment to a piston.

Meanwhile, when the linear motor according to the present embodiment is applied to a linear compressor, it may be connected to the piston of the linear compressor using the connecting member fixing portion of the integral mover as described above. FIG. 9 is a cross-sectional view showing a coupling structure of a connecting member for connecting an integral mover of the linear motor according to the present embodiment to a piston.

As illustrated in the drawing, a cylindrically-shaped connecting member 155 may be closely attached to one side surface of the mover body 151 according to the present embodiment, and the connecting member 155 may be fastened to the integral mover 150 by a bolt passing through the connecting member fixing portion 153 provided on an inner circumferential surface of the mover body portion 151.

As described above, when the integral mover and the connecting member are fastened together using the bolt, the integral mover and the connecting member may be easily coupled together, and moreover, the stator may not be additionally provided on an inner side of the integral mover, thereby further facilitating the assembly of the integral mover and the connecting member.

Figure 10:
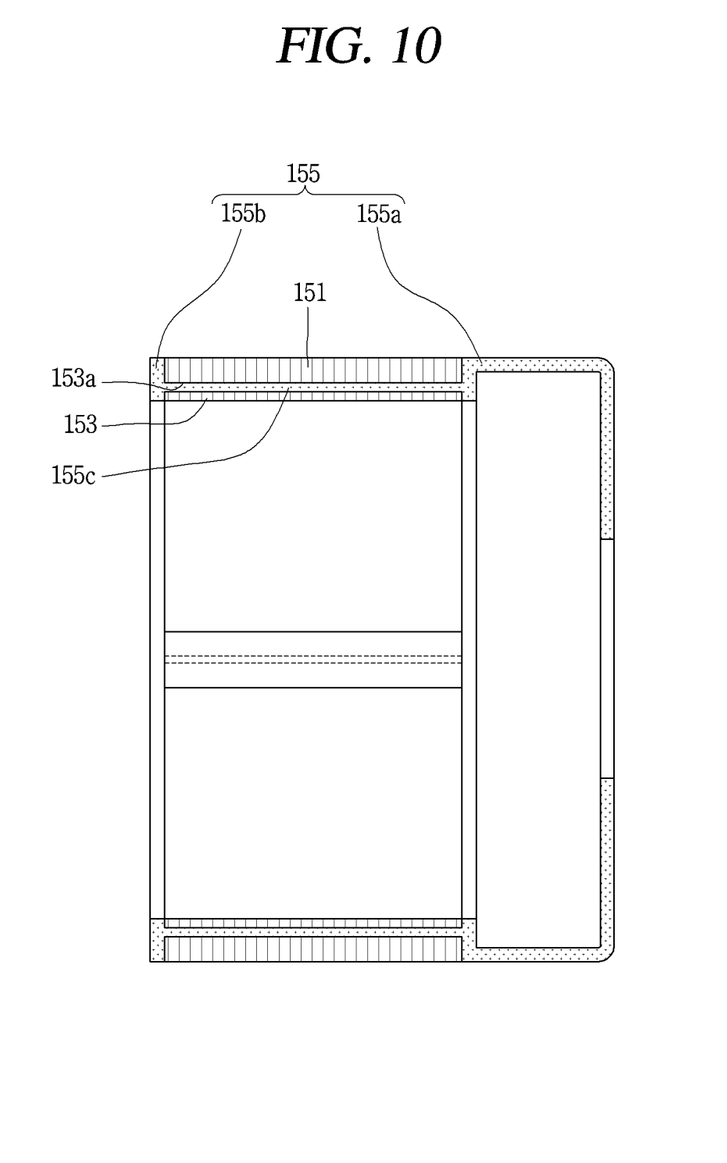
FIG. 10 is a cross-sectional view showing another embodiment of connecting an integral mover of the linear motor according to the present embodiment to a connecting member.

On the other hand, the integral mover and the connecting member may be molded and coupled together without being fastened with a bolt. FIG. 10 is a cross-sectional view showing another embodiment of connecting an integral mover of the linear motor according to the present embodiment to a connecting member.

As illustrated in the above, the mover body portion 151 and the connecting member 155 may be coupled together by insert molding to locate the connecting members 155a, 155b on both side surfaces of the mover body portion 151 according to the present embodiment.

However, in this case, a part of the connecting member 155 may be coupled through the mover body portion 151 to enhance a degree of coupling between the mover body portion 151 and the connecting member 155. For example, when the connecting member 155 is molded, the connecting portion 155c constituting a part of one connecting member 155a may pass through the through hole 153a of the connecting member fixing portion 153 provided on an inner circumferential surface of the mover body portion 151 to be coupled to the other connecting member 155. As a result, the connecting members 155a, 155b may be connected to each other by the connecting portion 155c with the integral mover 151 therebetween, thereby greatly enhancing a coupling force between the integral mover 151 and the connecting member 155.

Figure 11:
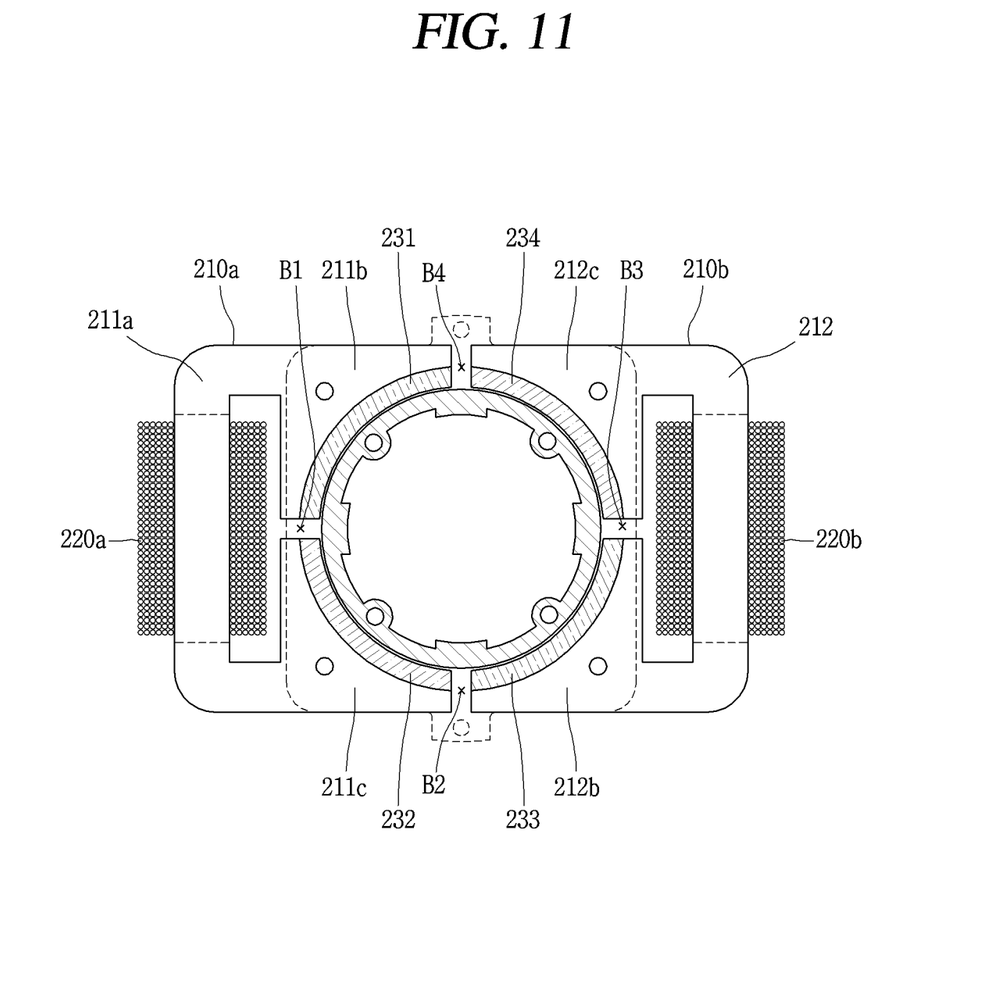
FIG. 11 is a plan view showing another embodiment of a stator according to the present embodiment.

On the other hand, in the above embodiments, examples in which the stator is divided into the first stator core and the second stator core, and the first stator core and the second stator core are again composed of a pair of two stator blocks have been described. However, the first stator core and the second stator core may be respectively formed as a single body. FIG. 11 is a plan view showing another embodiment of a stator according to the present embodiment.

As described above, the first stator core 210a includes a first yoke portion 211a, and a first tooth portion 211b and a second tooth portion 211c provided at both ends of the first yoke portion 211a, and the second stator core 210b may include a second yoke portion 212a and a third tooth portion 212b and a fourth tooth portion 212c provided at both ends of the second yoke portion 212a.

Magnets 231 to 234 made of ferrite magnets may be alternately arranged in the tooth portions (211b, 211c) (212b, 212c), respectively, with transverse air gaps (B1 to B4) along a circumferential direction.

The basic configuration and operation effects of the stator and the integral mover according to the present embodiment as described above are similar to those of the above-described embodiment. However, in this embodiment, as the first yoke portion 211a and the second yoke portion 212a are respectively formed as a single body, the first winding coil 220a and the second winding coil 220b may be formed by winding a coil on the first yoke portion 211a and the second yoke portion 212a, respectively, using a winding machine.

Accordingly, the yoke portions 211a, 212a of the first stator core 210a and the second stator core 210b may be easily formed in this embodiment as compared with the above-described embodiment. In other words, in the above-described embodiment, the yoke portion is inserted from both sides of the winding coil so that both yoke portions are brought into contact with each other in the winding coil. However, in the present embodiment, the coils 220a, 220b may be wound on the integrally formed yoke portions 211, 212, and thus the yoke portions may be formed more easily than the above-described embodiment, and the leakage of magnetic flux generated due to the separation of the yoke portions may be suppressed, thereby enhancing motor efficiency.

What is claimed is:

1. A transverse flux type linear motor, comprising:
a stator core comprising a plurality of stator sheets that are laminated along an axial direction of the stator core;
a winding coil located at the stator core and configured to generate a magnetic flux in the stator core in a transverse direction perpendicular to the axial direction;
a plurality of magnets that are coupled to a radial side surface of the stator core, that are arranged along a circumferential direction of the stator core, and that are configured to define alternating magnetic poles along the axial direction, the plurality of magnets being configured to alternate the magnetic poles in the circumferential direction; and
an integral mover spaced apart from the plurality of magnets in a radial direction of the stator core and configured to reciprocate in the axial direction with respect to the stator core based on magnetic force of the plurality of magnets,
wherein the integral mover comprises a magnetic body configured to define a magnetic path that allows the magnetic flux to extend from the plurality of magnets toward the stator core through the integral mover,
wherein the plurality of magnets are spaced apart from each other by a transverse gap in the circumferential direction, and
wherein the integral mover comprises:
a mover body portion that has an annular shape, and
one or more core protrusion portions that protrude in the radial direction from an inner circumferential surface of the mover body portion, the core protrusion portions being located at a position corresponding to the transverse gap between the plurality of magnets.

2. The transverse flux type linear motor of claim 1, wherein a circumferential length of each of the core protrusion portions is greater than or equal to a circumferential length of the transverse gap.

3. The transverse flux type linear motor of claim 1, wherein a radial thickness of the integral mover is less than or equal to a thickness of a portion of the stator core that is wound by the winding coil.

4. The transverse flux type linear motor of claim 1, wherein the integral mover comprises a plurality of electrical sheets laminated along the axial direction.

5. The transverse flux type linear motor of claim 1, wherein the integral mover is a single body manufactured by sintering or molding a magnetic material.

6. The transverse flux type linear motor of claim 1, wherein an axial length of the integral mover is less than an axial length of the plurality of magnets and greater than or equal to a half of the axial length of the plurality of magnets.

7. The transverse flux type linear motor of claim 1, wherein the stator core comprises a plurality of stator core blocks that are arranged along the circumferential direction and that define a transverse interval between the plurality of stator core blocks, each of the plurality of stator core blocks comprising tooth portions that face the transverse interval, and
wherein the plurality of magnets are fixed to the tooth portions.

8. The transverse flux type linear motor of claim 7, wherein the integral mover has an annular shape, and
wherein the integral mover comprises a core protrusion portion that protrudes radially inward from an inner circumferential surface of the integral mover and that is located at a position corresponding to the transverse interval.

9. The transverse flux type linear motor of claim 8, wherein the winding coil comprises a plurality of winding coils that are located between the plurality of stator core blocks and that are connected to each other electrically in series.

10. A linear compressor, comprising:
a case that defines an accommodation space;
a linear motor located in the accommodation space of the case, the linear motor comprising an integral mover configured to reciprocate in an axial direction;
a piston coupled to the integral mover and configured to reciprocate together with the integral mover;
a cylinder that receives the piston and that defines a compression space;
a suction valve configured to open and close a suction side of the compression space; and
a discharge valve configured to open and close a discharge side of the compression space, wherein the linear motor comprises a transverse flux type linear motor, the transverse flux type linear motor comprising:
  a stator core comprising a plurality of stator sheets that are laminated along the axial direction,
  a winding coil located at the stator core and configured to generate a magnetic flux in the stator core in a transverse direction perpendicular to the axial direction, and
  a plurality of magnets that are coupled to a radial side surface of the stator core, that are arranged along a circumferential direction of the stator core, and that are configured to define alternating magnetic poles along the axial direction, the plurality of magnets being configured to alternate the magnetic poles in the circumferential direction,
wherein the integral mover is spaced apart from the plurality of magnets in a radial direction of the stator core and configured to reciprocate in the axial direction with respect to the stator core based on magnetic force of the plurality of magnets,
wherein the plurality of magnets are spaced apart from each other by a transverse gap in the circumferential direction,
wherein the integral mover comprises:
  a mover body portion that has an annular shape, and
  a core protrusion portion that protrudes in the radial direction from an inner circumferential surface of the mover body portion, the core protrusion portion being located at a position corresponding to the transverse gap between the plurality of magnets, and
wherein the core protrusion portion is configured to define a magnetic path that allows the magnetic flux to extend from the plurality of magnets toward the stator core through the integral mover.

11. The linear compressor of claim 10, further comprising a connecting member that connects the integral mover to the piston,
  wherein the integral mover comprises a connecting protrusion portion that protrudes in the radial direction from an inner circumferential surface of the integral mover and that is coupled to the connecting member.

12. The linear compressor of claim 10, further comprising a connecting member that includes a part configured to insert to the integral mover and that is coupled to the piston.

13. The linear compressor of claim 12, wherein the integral mover comprises a connecting protrusion portion that is located at an inner circumferential surface of the integral mover and that defines a connecting hole configured to receive the part of the connecting member to fix the integral mover to the connecting member.

14. The linear compressor of claim 13, wherein the connecting hole penetrates the connecting protrusion portion in the axial direction from a first side to a second side of the integral mover, and wherein the part of the connecting member is coupled to the first side and the second side of the integral mover.

15. The linear compressor of claim 10, wherein an axial length of the integral mover is less than or equal to a half of an axial length of the plurality of magnets.

16. A transverse flux type linear motor, comprising:
a stator core that extends in an axial direction, the stator core comprising a plurality of stator core blocks arranged along a circumferential direction of the stator core;
a winding coil that surrounds at least portions of the plurality of stator core blocks and that is configured to generate a magnetic flux in the stator core in a transverse direction perpendicular to the axial direction;
a plurality of magnets that are coupled to an inner surface of the plurality of stator core blocks, that are spaced apart from each other in the circumferential direction, and that are configured to define alternating magnetic poles along the axial direction, the plurality of magnets being configured to alternate the magnetic poles in the circumferential direction; and
an integral mover that is located radially inside of the plurality of magnets, that is spaced apart from the plurality of magnets in a radial direction of the stator core, and that is configured to reciprocate in the axial direction with respect to the stator core based on the plurality of magnets alternating the magnetic poles along the axial direction,
wherein the stator core comprises a plurality of stator core blocks that are arranged along the circumferential direction and that define a transverse interval between the plurality of stator core blocks, each of the plurality of stator core blocks comprising tooth portions that face the transverse interval, and wherein the plurality of magnets are fixed to the tooth portions, and
wherein the integral mover has an annular shape, and wherein the integral mover comprises a core protrusion portion that protrudes radially inward from an inner circumferential surface of the integral mover and that is located at a position corresponding to the transverse interval.

17. The transverse flux type linear motor of claim 16, wherein each of the plurality of stator core blocks has a first circumferential end and a second circumferential end, each of the first circumferential end and the second circumferential end facing one of the plurality of the stator core blocks, and
  wherein each of the plurality of magnets extends from the first circumferential end to the second circumferential end of one of the plurality of stator core blocks.

* * * * *